United States Patent [19]
Philp et al.

[11] 3,928,695
[45] Dec. 23, 1975

[54] ODORLESS ELECTROCONDUCTIVE LATEX COMPOSITION

[75] Inventors: Dennis H. Philp; Norman L. Madison, both of Midland, Mich.

[73] Assignee: The Dow Chemical Company, Midland, Mich.

[22] Filed: June 28, 1974

[21] Appl. No.: 484,042

[52] U.S. Cl. ............ 428/95; 252/500; 260/29.7 N; 260/DIG. 18; 428/96; 428/262
[51] Int. Cl.² ... B32B 3/02; B32B 33/00; B32B 7/00
[58] Field of Search ............ 428/95, 96, 262; 260/DIG. 18, DIG. 20, 29.7 N, 29.7 R; 252/500

[56] References Cited
UNITED STATES PATENTS

| | | | |
|---|---|---|---|
| 3,205,187 | 9/1965 | Vanderhoff | 260/29.7 R |
| 3,674,711 | 7/1972 | Growald et al. | 252/500 |
| 3,823,056 | 7/1974 | Cooney | 428/96 |
| 3,841,902 | 10/1974 | Thompson et al. | 428/96 |

*Primary Examiner*—William J. Van Balen
*Attorney, Agent, or Firm*—Michael S. Jenkins

[57] ABSTRACT

An electroconductive latex is provided by adding a low molecular weight, a hydroxyalkyl quaternary ammonium salt, e.g., bis(2-hydroxyethyl)dimethyl ammonium chloride to an anionically stabilized latex. The resulting electroconductive latex is particularly useful as a textile backing composition in the production of coated textile articles which are free of amine odor. Odor caused by presence of aldehyde in the composition is effectively controlled by the presence of an aldehyde scavenger such as sodium bisulfite.

15 Claims, No Drawings

ODORLESS ELECTROCONDUCTIVE LATEX COMPOSITION

BACKGROUND OF THE INVENTION

This invention relates to electroconductive latexes prepared from anionically stabilized latexes, i.e., aqueous colloidal dispersions of solid addition polymers wherein the dispersed particles are stabilized by anionic means.

In general, textiles, particularly those made from hydrophobic synthetic resins, characteristically accumulate static charges. As a result of the formation of these static charges, many of these synthetic resins have been found somewhat unsatisfactory for certain purposes, e.g., use in the manufacture of rugs, carpets, seat covers and the like. In order to dissipate the accumulated static charges, it has been the practice in the art to coat the textile fibers with an electroconductive material, e.g., polyalkylene polyamines. More recently, especially in the manufacture of carpets and the like, metallic fibers have been interwoven with synthetic fiber or the carpet is made entirely of conductive synthetic fiber in order to provide means for dissipating accumulated static electricity. Both of the foregoing techniques are relatively successful in dissipating the charge from the carpet fibers.

The application of latexes, natural and synthetic, to rugs, carpets and other textile materials as backing materials, binders, etc. has grown very rapidly in recent years. Such growth is particularly noticeable in the manufacture of carpets since the development of tufted carpets. In such instances, latexes applied to the back of the rug or carpet prove to be a practical means for locking the tufts in place and strengthening the floor covering. The latexes also serve as an effective adhesive for binding the textile fiber to woven or non-woven materials, often called scrim.

Typically, anionically stabilized latexes are employed in these applications because of ease of preparation and ease of handling. Normally in the preparation of anionically stabilized latexes, a selected monomer or group of monomers is subjected to emulsion polymerization conditions in aqueous media containing anionic emulsifiers such as fatty acid salts, long-chain alkyl sulfates or sulfonates, alkyl aryl sulfonates and the like. A wide variety of polymers can be made in anionically stabilized latex form by this technique. Unfortunately, anionically stabilized latexes are generally non-conductive and are therefore unable to dissipate electrostatic charge coming from some charged electroconductive material such as an electroconductive coated fiber or metallic fiber. Consequently, when the conductive material, e.g., electroconductive textile fiber, is contactd by a person, the charge accumulates on the conductive material and is not adequately dissipated in many carpets which do not provide an electrical ground for the conductive material. As a result of the carpet's inability to adequately dissipate charge, an equally high charge builds up on the person. When the person exposed to such charge touches an object capable of grounding or dissipating that charge, he receives an unpleasant shock.

Previous attempts to improve the electroconductivity of anionically stabilized latexes by the addition of cationically active materials to the latex have not proved entirely successful. Addition of the cationically active materials directly to the anionically stabilized latex usually fails because the dispersed polymer phase coagulates or precipitates upon addition of the cationic agent. See U.S. Pat. No. 3,205,187. Only rarely can the resulting precipitate or coagulum be effectively redispersed by further addition of cationic material. Moreover, in most instances when the latex is not coagulated by the addition of the cationic agent such as a cationic polyelectrolyte or cationic organic polymers, the latex undergoes appreciable ionic destabilization. This ionic destabilization is due in many instances to the incompatibility between the cationic material and the latex polymer which is anionic in nature. Attempts to improve compatibility by the use of cationic soaps have usually resulted in a viscous paste which does not adhere well to the textile and which do not wear well under continued stress. As a further disadvantage, latex compositions containing the quaternary ammonium salts, generally the most effective of the known electroconductive additives, generate an unpleasant amine odor when subjected to conditions required to dry and cure the latex. In most of such instances, the amine odor arises from a volatile amine such as trimethyl amine produced upon decomposition of part of the quaternary ammonium additive.

In view of the disadvantages of preparing electroconductive latexes by prior art means, it would be highly desirable to provide an efficient electroconductive material suitable for employment as textile backing material which has physical strength comparable to the latex without additives and which remains essentially odorfree upon exposure to conditions required to finish textile backing compositions.

SUMMARY OF THE INVENTION

The present invention is such an electroconductive latex composition comprising an anionically stabilized latex, an amount of a hydroxyalkyl quaternary ammonium salt sufficient to measurably reduce the volume resistivity of the composition. In preferred textile backing compositions, the foregoing composition also contains an amount of an aldehyde scavenger sufficient to absorb all aldehydes produced during finishing of the composition.

In addition to having excellent electroconductive properties, the preferred electroconductive latex compositions of this invention are shelf-stable for a substantial period of time, e.g., for at least 8 hours, and have generally low viscosities, e.g., below 18,000 centipoise (cps) at room temperature using a No. 5 spindle at 20 revolutions per minute (rpm). In this regard, these novel latex compositions differ significantly from previous latex compositions containing cationic organic polymers. Moreover, the electroconductive latex of the instant invention adheres well to substantially all textiles, wears well under continued stress and does not generate odors, particularly those characteristic of amines when subjected to conditions normally required to finish (dry and cure) the latex composition. In preferred latex compositions, unpleasant odors arising from presence of aldehydes are controlled by including an aldehyde scavenger in the composition.

In a particularly useful embodiment, the electroconductive latex composition is employed in scrim backed textile articles to bond the scrim to the textile fabric. In addition to their primary utility as textile backing materials, the electroconductive latex compositions of the present invention are useful for coating and impregnating paper, textiles and other substrates including those of wood and plastic.

DETAILED DESCRIPTION OF THE EMBODIMENTS

By "anionically stabilized latex" is meant an anionically stabilized aqueous colloidal dispersion of a solid thermoplastic organic addition polymer wherein the polymer particles possess a negative charge, demonstrable electrophoretically as being attracted to the anode of an electrolytic cell, whether such charge be generated by action of a polymerizable anionic monomer constituent, an absorbed anionic emulsifier, a reactive catalyst, or otherwise, including any combination thereof. Kinds of polymerizable unsaturated monomers, aqueous polymerization media, catalysts, emulsifiers, procedures and means for making anionically stabilized latexes are well known in the art and reference is made thereto for the purposes of the present invention. Merely for purposes of illustration and not for limitation, reference is made to the art-accepted treatise, "Polymer Processes," edited by Calvin E. Schildknecht, published (1956) by Interscience Publishers, Incorporated, New York, Chapter IV. "Polymerizations in Emulsion," by H. Leverne Williams. There is set forth in Table II of that publication diverse kinds of monomers which can be polymerized alone (homopolymers) or in mixtures (copolymers). Diverse anionic emulsifiers, catalysts and catalyst activators, chain transfer agents, and procedural steps are also set forth in the cited book and other published art. Reference is also made to "Emulsion Polymerization," by F. A. Bovey et al., published (1955) by Interscience Publishers, Incorporated, New York.

Of particular interest in this invention are the latexes of vinylaromatic polymers such as the polymers of styrene; substituted styrenes, e.g., ar-bromo- and ar-chlorostyrenes, α-methylstyrene, ar-t-butylstyrene, vinylnaphthalene, and other monovinylidene carbocyclic aromatic monomers. The term "vinylaromatic polymers" includes homopolymers and copolymers thereof with other ethylenically unsaturated monomers copolymerizable therewith, particularly the conjugated dienes such as butadiene and isoprene. Of special interest are the latexes of styrene/butadiene copolymers having up to 5 weight percent based on copolymer of ethylenically unsaturated carboxylic acids copolymerized therewith, e.g., acrylic acid, itaconic acid, maleic acid and methacrylic acid.

Other anionically stabilized latexes commonly employed as binders in textile backing compositions are also suitably employed in the practice of this invention.

The hydroxyalkyl quaternary ammonium salt, hereinafter referred to as the ammonium salt, employed in the present invention has the formula:

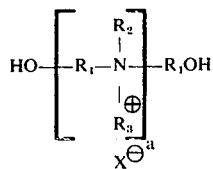

wherein $R_1$ is alkylene having from 1 to 6 carbons atoms, preferably 2 to 4 carbon atoms; $R_2$ is alkyl having 1 to 6 carbons atoms, preferably 1 to 2 carbon atoms; or $(C_nH_{2n}O)_yH$ where $y$ is 1 to 4, preferably 1; and $n$ is an integer from 1 to 4, preferably 2 to 3; $R_3$ is alkyl having 1 to 6, preferably 1 to 2 carbons or $(C_nH_{2n}O)_yH$ where $y$ is 1 to 4, preferable 1; $a$ is an integer from 1 to 15, and X is an anion, beneficially a monovalent anion such as nitrate or a halide such as chloride, bromide and iodide or a divalent anion such as sulfate. In especially preferred ammonium salts, X is chloride, $R_1$ is ethylene, $R_2$ is methyl or 2-hydroxyethyl, $R_3$ is methyl, and $a$ is 1 to 2.

Exemplary preferred ammonium salts are bis(2-hydroxyethyl)dimethyl ammonium chloride and tris(2-hydroxyethyl)methyl ammonium chloride. Exemplary suitable ammonium salts include bis(2-hydroxyethyl)dimethyl ammonium bromide, tris(2-hydroxyethyl)methyl ammonium iodide, ethylene bis[(2-hydroxyethyl)dimethyl ammonium chloride], and ethylene bis[(2-hydroxyethyl)diisopropyl ammonium chloride].

The aforementioned preferred ammonium salts are readily prepared by reacting diethanol or triethanol amine with methyl chloride and a strong base such as sodium hydroxide. The polymeric ammonium salts such as ethylene bis[(2-hydroxyethyl)dimethyl ammonium chloride] can be prepared, for example, by first reacting ethanolamine with 1,2-dichloroethane to form ethylene bis [(2-hydroxyethyl)amine] which can then be reacted with methyl chloride and sodium hydroxide to form the desired ammonium chloride. The foregoing reactions are readily carried out under conditions known to those skilled in the art.

Suitable aldehyde scavengers are materials which combine with aldehydes to form stable, non-volatile products and which do not react with ammonium salt or coagulate or otherwise destabilize the anionically stabilized latex. Exemplary scavengers include the bisulfites, e.g., sodium bisulfite and potassium bisulfite;

In the preferred embodiments, the invention is practiced by adding the ammonium salt advantageously in the form of an aqueous solution containing from about 30 to about 80 weight percent of the ammonium salt, preferably 60 to 70 weight percent, and an aqueous solution of from about 10 to about 50 weight percent of the aldehyde scavenger to the latex. When filler is used, the ammonium salt can be added before or after filler, e.g., calcium carbonate, has been dispersed in the latex. In most preferred practices, the ammonium salt is added to the latex formulation prior to the addition of thickeners, e.g., conventional thickeners are anionically stabilized latexes such as sodium polyacrylate, if thickeners are to be added. During the addition of it is desirable to agitate the latex or latex/filler formulation vigorously. The concentration of the ammonium salt in the aqueous solution, the percent solids of the anionically stabilized latex and the concentration of the filler are not critical and therefore may vary as in conventional formulations. The aldehyde scavenger is most preferably added to the composition after addition of the ammonium salt although it is not critical to do so. In this regard, it should be understood that the foregoing order of addition of ingredients is preferred and that alternative orders of addition may be suitably employed. For example, one advantage of this invention over conventional processes is that mixing of the ammonium salt, the latex and filler, when used, can be accomplished without significant increase in viscosity of the resulting composition. Mixing of the foregoing materials can be readily accomplished with conventional mixing apparatus such as stirrers, pumps, homogenizers and the like. The temperature of the mixing is not critical and is conveniently at or near room temperature.

Beneficially, the amount of ammonium salt combined with the anionically stabilized latex is in the range from about 2 to about 40 parts (dry) by weight per 100 parts (dry) of latex polymer, preferably from about 7 to about 10 parts by weight. It is understood, however, that the charge density of the ammonium salt will affect the preferred amount of the ammonium salt to be employed. For example, bis(2-hydroxyethyl)-dimethyl ammonium chloride having a charge density of 1 charge/170 grams can be employed in lower amounts than tris-(2-hydroxyethyl)methyl ammonium chloride or bis(2-hydroxyethyl)dimethyl ammonium bromide having charge densities of 1 charge/200 grams and 1 charge/215 grams, respectively.

When employed, as it is in preferred embodiments, the aldehyde scavenger is preferably used in amounts from about 1 to 50, especially from about 5 to 10, weight parts based on 100 weight parts of the ammonium salt.

In the most advantageous practice of the present invention, the latex composition, advantageously to be used as a carpeting backing, contains a conventional amount of a filler such as calcium carbonate, clay, titanium dioxide, and the like, preferably calcium carbonate. Generally, conventional amounts of filler range from about 100 to about 450 dry weight parts based on 100 dry weight parts of latex.

Following addition of the aforementioned ingredients to the latex composition, it is sometimes desirable to increase the viscosity of the composition to the value desired for the particular application by the addition of a conventional thickener such as sodium or potassium polyacrylate, sodium carboxymethyl cellulose, casein, and the like.

In addition to the aforementioned fillers, thickeners and surfactants, other ingredients typically employed in latex formulations, e.g., inorganic or organic salts (electrolytes) thickeners, buffer agents, pH adjusting agents and the like, may also be added to the latex. Preferably such ingredients are added to the latex prior to combination of the latex with the ammonium salt.

The resulting electroconductive latex composition, with or without filler and thickener can be easily applied as a layer to a substrate, cured and then dried by conventional means. In a preferred embodiment, the electroconductive latex composition containing on a dry basis from about 20 to about 35 weight percent of latex polymer solids and from about 62 to about 79 weight percent of filler such as calcium carbonate, from about 1 to about 3 weight percent of ammonium salt, from about 0.05 to about 0.3 weight percent of aldehyde scavenger and an amount of thickener effective to provide the desired viscosity, e.g., for carpet backing from about 6,000 to about 15,000 cps at ambient temperatures using a No. 5 spindle and 20 rpm, is applied as an aqueous dispersion having from about 50 to about 80 weight percent total solids to a fibrous substrate, e.g., carpeting material or other fabric and exposed to conditions of temperature, etc., sufficient to dry and cure the latex composition. The resulting substrate is found to significantly reduce the accumulation of static charge on hydrophobic textile materials. For example, substrates with exhibit improved electroconductivity when treated with the composition of this invention include the hydrophobic natural resins, for example, wool, cotton and the like, and synthetic resins, for example, nylon, polyester, polyolefin and polyacrylonitrile. Substrates particularly improved in this regard are fibers and filaments of synthetic resins and articles woven therefrom. It is understood that the latex composition containing only the latex and the ammonium salt may be usefully employed in many of the aforementioned applications. In addition such compositions are useful in application to other substrates such as paper, plastic film, and non-woven fibrous materials.

The following examples are given to illustrate more clearly the principle and the practice of this invention to those skilled in the art and are not for purposes of limitation. Throughout this specification and claims all parts and percentages are by weight unless otherwise indicated.

EXAMPLE 1

An aqueous solution of bis(2-hydroxyethyl)dimethyl ammonium chloride (BHDMAC) is added to an anionically stabilized latex containing calcium carbonate as filler to form the following carpet backing formulation:

| Ingredients | Dry Weight, g | Wet Weight, g |
|---|---|---|
| BHDMAC | 9.2 | 13.1 |
| Latex* | 100 | 215 |
| Calcium Carbonate | 350 | 350 |
| Water | | 77.9 |

*An anionically stabilized aqueous dispersion of styrene/butadiene/itaconic acid (52/45/3) terpolymer.

A 3 g portion of an aqueous solution of sodium bisulfite (33% active) is added to the foregoing formulation. The formulation has a Brookfield viscosity of about 100 cps at room temperature using a No. 5 spindle and 20 rpm. The viscosity of the formulation is increased to 10,800 cps by adding 9 g. of an aqueous solution (9.1% active) of a conventional sodium polyacrylate thickener.

For purposes of comparison, an aqueous solution of polyepichlorohydrin having the molecular weight of about 500 and quaternized with trimethylamine to a degree of 100 mole percent is added to an anionically stabilized latex containing calcium carbonate as filler to form the following carpetbacking formulation:

| Ingredients | Dry Weight | | Wet Weight | |
|---|---|---|---|---|
| Quaternized polyepichlorohydrin | 9.2 | g | 18.4 | g |
| Latex* | 100 | g | 215 | g |
| Calcium carbonate | 350 | g | 350 | g |
| Water | — | | 76 | g |

*an anionically stabilized aqueous dispersion of a styrene/butadiene copolymer.

A 3 g. portion of an aqueous solution of sodium bisulfite (33% active) is added to the formulation. The foregoing formulation has a Brookfield viscosity of about 100 cps at room temperature using a No. 5 spindle and 20 rpm. The viscosity of the formulation is increased to 11,000 cps by adding 12 g. of an aqueous solution (9.1% active) of a conventional sodium polyacrylate thickener.

Another composition is similarly prepared except that no quaternary ammonium salt or quaternized polyepichlorohydrin is used.

Portions of each of the foregoing carpetbacking compositions are cast onto Teflon coated glass plates in the form of a 0.02 inch wet layer, dried at ambient temperature and conditioned at 20% relative humidity for 24 hours. Volume resistivity of the resulting dried residue composition of the present invention as determined by ASTM D-257-61 is $4.0 \times 10^{10}$ ohm centimeters/square as compared to a volume resistivity of $1.0 \times 10^{11}$ ohm centimeters/square for a similarly dried film of the starting latex containing quaternized polyepichlorohydrin and a volume resistivity of $3.0 \times 10^{15}$ ohm centimeters/square for the composition containing no ammonium salt or quaternized polyepichlorohydrin.

Another portion of each of these carpetbacking formulations are applied at 25–30 ounces per square yard to the back side of a 27 inch × 36 inch piece of low level loop (10th gauge) carpet containing nylon and metallic fiber. Jute is applied as backing after the latex has been applied. The resulting samples are cured at 275°F for a period of 12–15 minutes and are then conditioned for at least 72 hours at 20% relative humidity. The static voltage generated on the resulting carpet samples, bond strength and odor of carpet samples are determined and the results are recorded in Table I.

EXAMPLE 2

Compositions of different amounts of different electroconductive additives are prepared and tested for volume electrical resistivity. A control sample (C) containing no electroconductive additive is similarly prepared and tested. The results are recorded in Table II.

TABLE II

| Sample No. | Electroconductive Additive Type | Amount(1),wt.% | Volume Electrical Resistivity(2) ohm-cm/sq. |
|---|---|---|---|
| C* | None | — | $3.0 \times 10^{15}$ |
| 1 | BHDMAC** | 1.0 | $8.52 \times 10^{11}$ |
| 2 | " | 1.5 | $7.13 \times 10^{10}$ |
| 3 | " | 2.0 | $4.00 \times 10^{10}$ |
| 4 | " | 3.0 | $5.76 \times 10^{9}$ |
| 5 | " | 4.0 | $7.67 \times 10^{8}$ |
| 6 | " | 5.0 | $2.38 \times 10^{8}$ |
| 7 | THDMAL*** | 1.0 | $8.6 \times 10^{11}$ |
| 8 | " | 2.0 | $4.8 \times 10^{10}$ |
| 9 | " | 3.0 | $9.1 \times 10^{9}$ |
| 10 | " | 4.0 | $5.9 \times 10^{9}$ |
| 11 | " | 5.0 | $3.1 \times 10^{9}$ |
| 12* | Quaternized Polyepichlorohydrin | 1.0 | $3.92 \times 10^{12}$ |
| 13* | " | 1.5 | $2.40 \times 10^{11}$ |
| 14* | " | 2.0 | $8.71 \times 10^{10}$ |
| 15* | " | 2.5 | $2.94 \times 10^{10}$ |
| 16* | " | 3.0 | $1.48 \times 10^{10}$ |
| 17* | " | 4.0 | $3.21 \times 10^{9}$ |
| 18* | " | 5.0 | $5.01 \times 10^{8}$ |

*Not an example of the invention.
**bis(2-hydroxyethyl)dimethyl ammonium chloride
***tris(2-hydroxyethyl)methyl ammonium chloride
(1)weight percent based on total composition solids (dry weight)
(2)ASTM D-257-61

In Samples Nos. 1–11 of Table II, no amine odor is detected during or after drying and curing of the compositions. Detectable amine odor is detected for each of Samples Nos. 13–18 after drying and curing under the same conditions.

EXAMPLE 4

Several compositions are prepared in accordance with Example 1 using 6.9 dry weight parts of bis(2-hydroxyethyl)dimethyl ammonium chloride (70% active) and varying amounts of sodium bisulfite as aldehyde scavenger. The resulting compositions are tested for aldehyde odor and the results are recorded in Table III.

TABLE I

| Sample No. | 1 | 2* | 3* |
|---|---|---|---|
| Electroconductive Additive | BHDMAC** | Quaternized Polyepichlorohydrin | None |
| Static Voltage Generation(1), volts | 1300 | 1300–1600 | 2400–2900 |
| Bond Strength(2), lbs. | 13–17 | 9–13 | 15–20 |
| Odor(3) | Normal Carpet | Strong Amine | Normal Carpet |

*Not an example of this invention
**BHDMAC-Bis(2-hydroxyethyl)dimethyl ammonium chloride
(1)AATCC Test Method 134-69
(2)Described No. 170-297-3M-69
(3)Carpet samples are cured in 275° oven for 15 minutes, withdrawn and immediately sealed in polyethylene bags. The bags are opened after 2 days and samples smelled.

TABLE III

| Sample No. | NaHSO₃(1) wt. % | Odor |
|---|---|---|
| 1 | 0.2 | Normal Carpet |
| 2 | 0.4 | " |
| 3 | 0.6 | " |
| 4 | 0.8 | " |
| 5 | 1.0 | " |
| 6 | None | Sharp pugent aldehyde odor |

(1)Weight percent based on latex polymer (dry weight).

What is claimed is:

1. An electroconductive latex composition comprising an anionically-stabilized latex and a hydroxyalkyl quaternary ammonium salt represented by the formula:

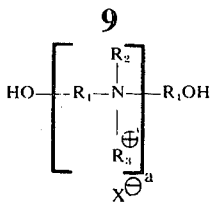

wherein $R_1$ is alkylene having from 1 to 6 carbon atoms, $R_2$ is alkyl having 1 to 6 carbon atoms or $(C_nH_{2n}O)_yH$ where $y$ is 1 to 4 and $n$ is an integer from 1 to 4, $R_3$ is alkyl having 1 to 6 carbon atoms or $(C_nH_{2n}O)_yH$ where $y$ is 1 to 4 and $n$ is an integer from 1 to 4, $a$ is an integer from 1 to 15, and X is an anion, said ammonium salt being present in an amount sufficient to measurably reduce the volume resistivity of said composition.

2. The composition of claim 1 comprising an anionically stabilized latex of a thermoplastic, organic polymer; a hydroxyalkyl quaternary ammonium salt represented by the formula:

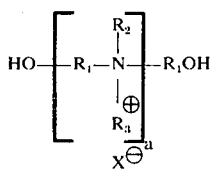

wherein $R_1$ is alkylene having from 1 to 6 carbon atoms, $R_2$ is alkyl having 1 to 6 carbon atoms or $(C_nH_{2n}O)_yH$ where $y$ is 1 to 4 and $n$ is an integer from 1 to 4, $R_3$ is alkyl having 1 to 6 carbon atoms or $(C_nH_{2n}O)_yH$ where $y$ is 1 to 4, $a$ is an integer from 1 to 15, and X is an anion, said ammonium salt being present in an amount sufficient to measurably reduce the volume resistivity of said composition and an amount of an aldehyde scavenger sufficient to absorb all aldehydes existing in the composition after finishing of said composition.

3. The composition of claim 1 wherein the ammonium salt is bis(2-hydroxyethyl)dimethyl ammonium chloride.

4. The composition of claim 1 wherein the ammonium salt is tris(2-hydroxyethyl)methyl ammonium chloride.

5. The composition of claim 1 wherein the aldehyde scavenger is a bisulfite salt.

6. The composition of claim 1 wherein the scavenger is sodium bisulfite.

7. The composition of claim 1 wherein the composition contains from about 2 to about 40 dry weight parts of the ammonium salt based on the 100 dry parts of latex polymer solids and from about 1 to about 50 weight parts of the aldehyde scavenger based on 100 weight parts of the ammonium salt.

8. The composition of claim 1 wherein the composition comprises on a dry basis from about 20 to about 35 weight percent of latex polymer solids, from about 62 to 79 weight percent of filler, from about 1 to about 3 weight percent of the ammonium salt, from about 0.05 to about 0.3 weight percent of aldehyde scavenger and an amount of thickener effective to provide a Brookfield viscosity in the range from about 6,000 to about 15,000 centipoise at ambient temperature using a No. 5 spindle at 20 rpm.

9. The composition of claim 1 wherein the ammonium salt is represented by the formula:

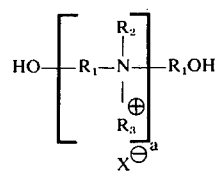

wherein $R_1$ is ethylene, $R_2$ is methyl or 2-hydroxyethyl, and $a$ is 1 to 2 and the aldehyde scavenger is a bisulfite salt.

10. The composition of claim 5 wherein the filler is calcium carbonate and the thickener is sodium polyacrylate.

11. The composition of claim 1 wherein the composition is applied as a backing to a textile fabric.

12. The composition of claim 1 wherein the composition is applied as a backing to carpet.

13. The composition of claim 12 wherein the latex is a latex of a vinyl aromatic polymer.

14. The composition of claim 12 wherein the latex is a latex of styrene.

15. The composition of claim 12 wherein the latex is a latex of styrene/butadiene copolymer.

* * * * *